United States Patent

[11] 3,554,470

| [72] | Inventor | Robert E. Dudley |
| --- | --- | --- |
| | | Bellevue, Wash. |
| [21] | Appl. No. | 852,969 |
| [22] | Filed | Aug. 18, 1969 |
| [45] | Patented | Jan. 12, 1971 |
| [73] | Assignees | Richard M. Tracey |
| | | Seattle, Wash. |
| | | a part interest; |
| | | Gerald R. Brunstrom |
| | | Dalkeith, Australia, a part interest |
| | | Continuation of application Ser. No. |
| | | 645,213, June 12, 1967, now abandoned. |

[54] AIRPORT
19 Claims, 14 Drawing Figs.

[52] U.S. Cl. .................................................... 244/114
[51] Int. Cl. ...................................................... B64f 1/36
[50] Field of Search ............................................ 244/114

[56] References Cited
UNITED STATES PATENTS

| 2,487,613 | 11/1949 | Stone ............................ | 244/114 |
| --- | --- | --- | --- |
| 2,750,135 | 6/1956 | Anderson ...................... | 244/114 |
| 2,765,994 | 10/1956 | Jordanoff ...................... | 244/114 |
| 3,162,404 | 12/1964 | Squire ............................ | 244/114 |

FOREIGN PATENTS

| 1,462,548 | 11/1966 | France .......................... | 244/114 |
| --- | --- | --- | --- |

OTHER REFERENCES

Aviation Age. - December 1953, pages 32— 33. Aviation Week & Space Technology. - December 19, 1966, pages 39, 41 and 43. Popular Science, September 1952, pages 102— 103. Airport Building & Aprons, Second Edition I.A.T.A., August 1959, pages 89, 90, 97, 98. (Copy in Group 315.)

*Primary Examiner*—Milton Buchler
*Assistant Examiner*—Paul E. Sauberer
*Attorney*—Robert W. Beach ABSTRACT: A taxiway is located between two runways, which runways may be disposed in tandem, either in a straight line or offset laterally somewhat relative to each other, or disposed at a small angle to each other, or the runways may be in substantially parallel laterally offset relationship. The runways and taxiways between them may be floating on a body of water, or supported on columns over shallow water, over train tracks, or over one or more roadways. Airport terminal buildings or docks are arranged in a row generally parallel to the taxiway, and passenger transporting means connect the buildings or docks. Each terminal building includes a recess into which an airplane wing can be moved spanwise, and transfer means such as a shiftable platform running on rails can support an airplane for movement transversely of the length of its fuselage to locate the airplane wing within the terminal building and the airplane fuselage alongside the terminal building. An airplane can be loaded by elevators adjacent to the terminal building and by a walkway movable downward into a position alongside the airplane fuselage.

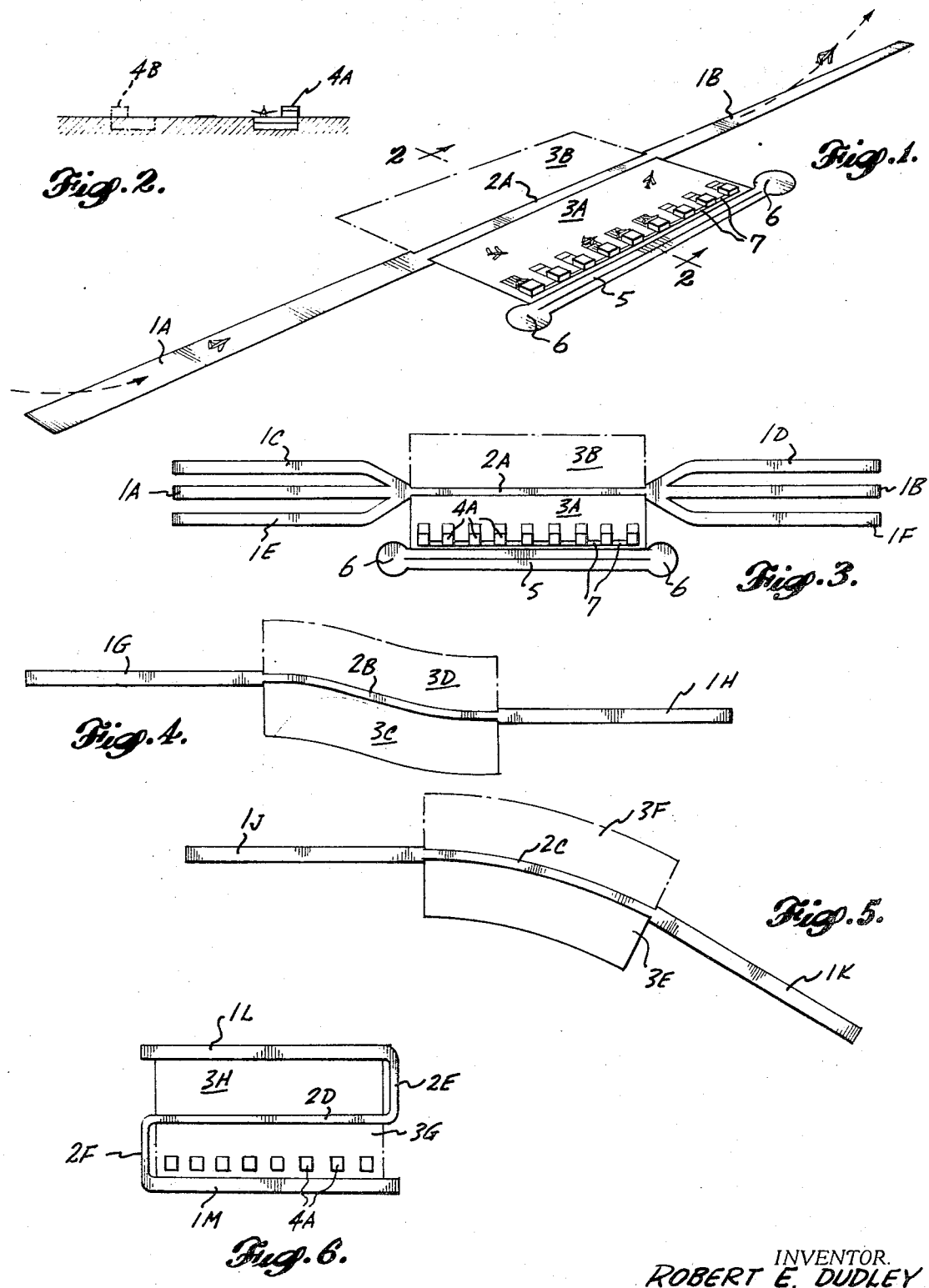

PATENTED JAN 12 1971
3,554,470
SHEET 2 OF 3
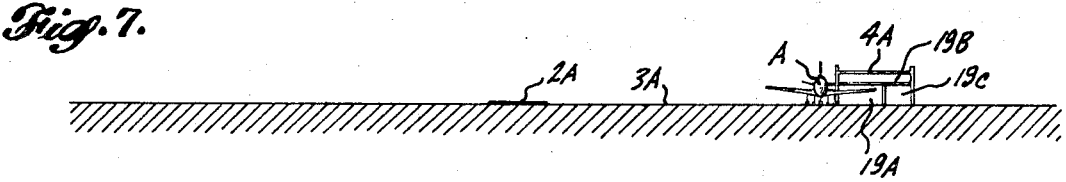
Fig. 7.
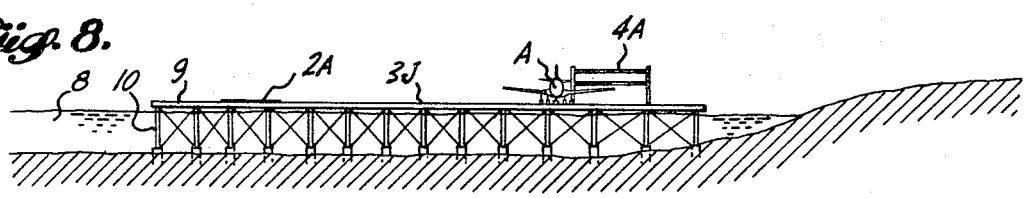
Fig. 8.
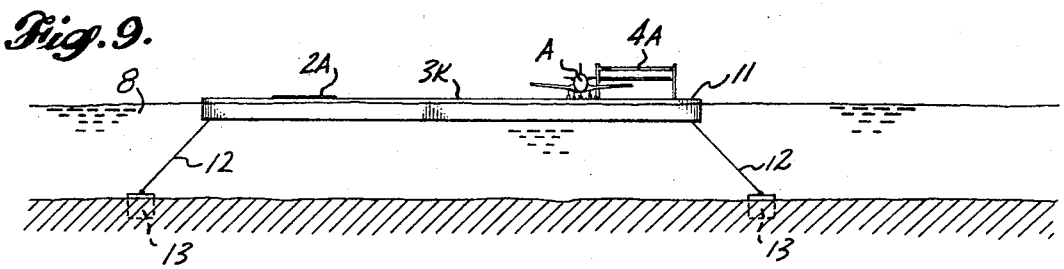
Fig. 9.
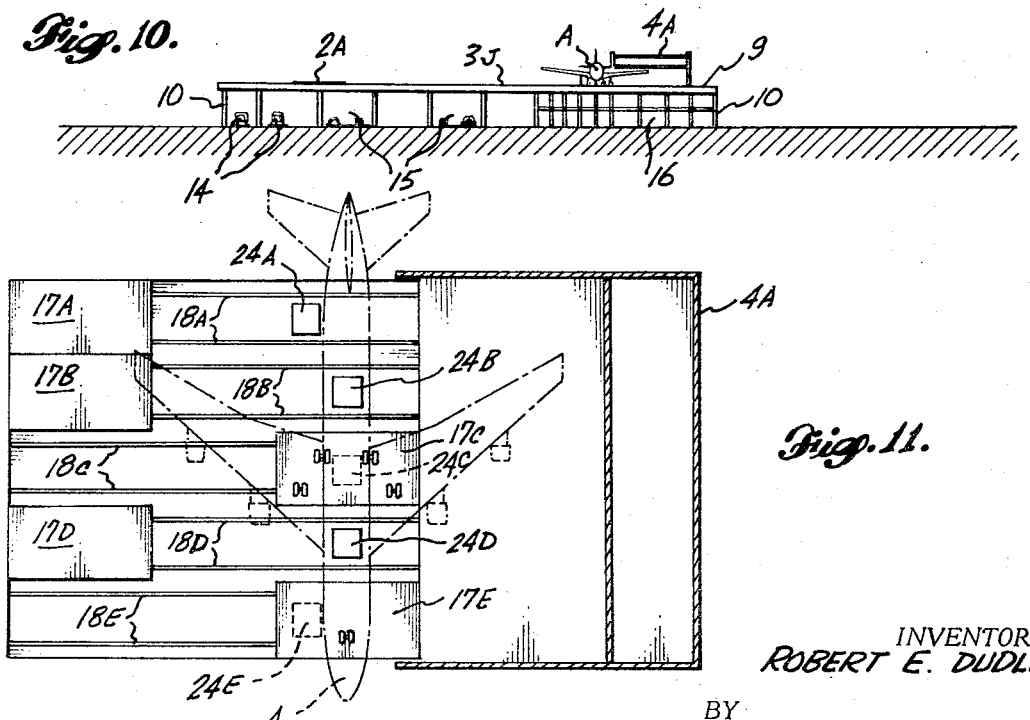
Fig. 10.
Fig. 11.
INVENTOR.
ROBERT E. DUDLEY
BY Robert W. Beach
ATTORNEY

PATENTED JAN 12 1971

INVENTOR.
ROBERT E. DUDLEY
BY
Robert W. Beach
ATTORNEY

AIRPORT

This application is a continuation of application Ser. No. 645,213 filed Jun. 12, 1967, now abandoned, for Airport.

Air transportation has become increasingly more popular, resulting in the construction and prospect of progressively larger and faster airplanes, but such airplanes cannot alone solve the problems of air travel. The increase in popularity of air travel has resulted largely from the greater speed and convenience associated with it. As airplanes increase in size and the amount of air traffic increases, larger airports having longer runways and bigger and better air terminal facilities are required, yet the increase in size of airports and terminal buildings has the disadvantage of making it difficult at such airports to transfer from one airline to another, and to facilitate the loading and unloading of passengers, baggage and cargo.

Also, the busiest airports and consequently, those which need to be largest, serve metropolitan areas, and as the metropolitan areas grow in population, large tracts of unimproved land which have been required for airports are more difficult to find and are more expensive. The greater the distance between an airport and the metropolitan center which it serves, the more time is required for transportation between the airport and the metropolitan center. Also, if an airport is moved to a different location in order to obtain more area, great expense is required to build or improve roads to the new airport site or to provide rapid transit facilities to it. Great loss is also incurred by abandoning airports which have been discarded. Because of the desirability of transferring from one airline to another, it is disadvantageous to have more than one major airport serving a particular metropolitan center, but it has been necessary in various areas to resort to this expedient.

It is a principal object of the present invention, therefore, to provide a type of airport which can be used by large and fast airplanes, but which can be located comparatively economically in close proximity to the central portion of a metropolitan area.

More particularly, it is an object to provide such an airport in which the rights of way for runways and a taxiway can have multiple use, such as for a combination of transportation facilities which may include railway lines and roadways.

Another object is to provide such an airport in which the length of the runways can be increased to whatever extent may be required with minimum expense, and which runway lengthening will not require relocation of the airport.

An important object of the present invention is to provide an airport in which the time required for maneuvering the airplane on the ground for taxiing and parking will be minimized and interference between airplanes taxiing or parking will be reduced.

A further object is to provide an airport in which its landing and takeoff capacity can be increased as may be required from time to time with the least expense.

An additional object is to provide air terminal facilities for such an airport which will be located most conveniently, and which will expedite loading and unloading of aircraft.

Another object is to provide an arrangement for an airport terminal building which will facilitate servicing of the aircraft while it is being loaded and unloaded, and which will provide protection for servicing personnel from inclement weather.

It is also an object to facilitate transfer of passengers and cargo between terminal building facilities of different airlines.

FIG. 1 is a top perspective of a representative form of airport in accordance with the present invention, and FIG. 2 is a transverse section through a portion of the airport taken on line 2—2 of FIG. 1.

FIGS. 3, 4, 5 and 6 are plans of different variations of the airport in accordance with the present invention.

FIGS. 7, 8, 9 and 10 are transverse vertical sections through different types of airport structures according to this invention.

FIG. 11 is a plan of one portion of an airport according to the present invention.

Figure 12:
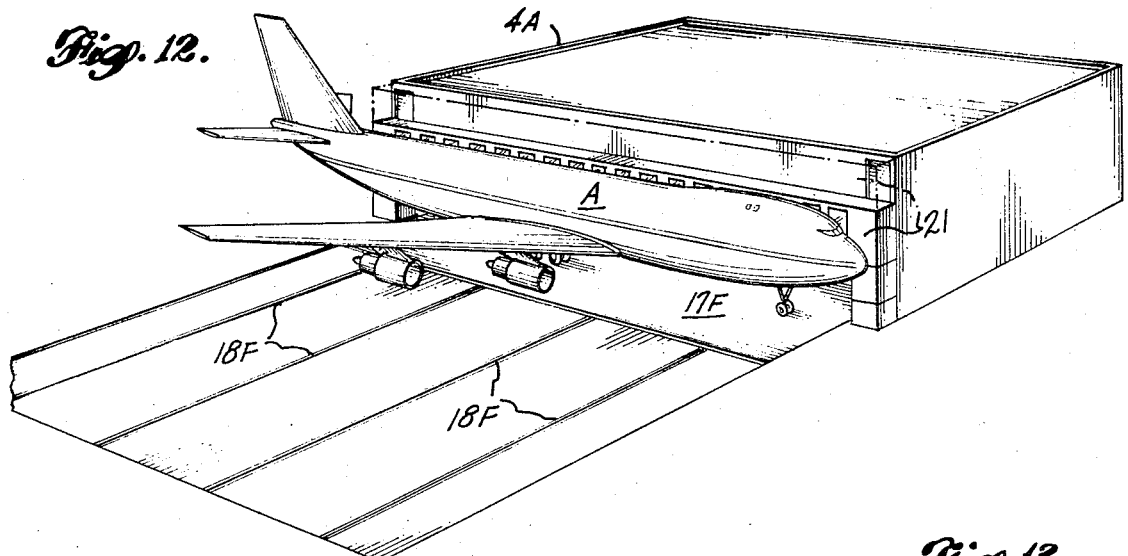
FIG. 12 is a top perspective of a similar portion of an airport showing a somewhat modified construction.

The airport of the present invention has three principal characteristics: first, the arrangement of a taxiway between two runways so as to expedite ground maneuvering of aircraft; second, the arrangement of such runways and taxiways so that, particularly when the airport is close to a metropolitan center, the rights of way can be shared with surface transportation; and, third, expediting loading and unloading of airplanes at the air terminal buildings.

The first principal objective of expediting ground maneuvering of aircraft is accomplished by providing an arrangement of runways and a taxiway in which the taxiway is located between the runways, as shown in FIGS. 1 to 6, inclusive. In FIG. 1, the runways 1A and 1B are arranged in tandem at opposite ends of, and in substantial alignment with, the intermediate connecting taxiway 2A joining the nearer ends of such runways. Each runway 1A and 1B is of a length sufficient to enable an airplane to land or to take off, so that each such runway should be at least one mile in length. The taxiway 2A between the runways may be shorter than the runways, its length depending on the extent of the air terminal facilities located alongside such taxiway.

In most localities, the prevailing winds blow generally in one direction or in the opposite direction and seldom blow directly across such prevailing wind direction. In any case, particularly large commercial airplanes can land or take off without great difficulty in a direct crosswind of considerable velocity. Consequently, operation of an airport is satisfactory in most instances if only one main runway direction is provided. The traffic along such runway could, of course, be reversed in direction simply by changing the landing and takeoff pattern so that under no wind conditions would an airplane land or takeoff at an angle of more than 90° to the wind direction.

The usual arrangement of an airport requires that when the wind is blowing in a particular direction, one runway be used for both landing and takeoff. In some large airports, parallel runways are provided for this purpose which are spaced transversely of their lengths. In an airport having a runway arrangement such as shown in FIG. 1, one of the runways 1A, for example, can be used for landing while the other runway 1B is used for taking off without conflict. In the event that a landing on runway 1A should be misjudged so that it is necessary for the airplane attempting to land to take off again, there would still be no conflict with traffic on runway 1B because the airplane taking off again from runway 1A could veer to one side or the other so as not to fly over the runway 1B. The taxiway 2A should, of course, be cleared by landing airplanes as promptly as possible so that there would be no airplane on the portion of the taxiway adjacent to the landing runway during landing of the next airplane.

Ground maneuvering is minimized because an airplane landing on runway 1A, for example, could maintain a high taxi speed from such runway to the taxiway 2A, because it would be traveling a straight course, and would not be required to turn sharply onto a taxiway at the side of the runway, as is required at many airports being used at present. As soon as the landing airplane reaches the taxiway 2A, it can turn off such taxiway onto an apron 3A or 3B at opposite sides of such taxiway so as to leave the course in extension of runway 1A clear. The airplane can then proceed across the apron 3A or 3B to the particular air terminal building at which it is to park by the shortest possible route.

When a single runway is used for both landing and taking off, it is necessary for an airplane to taxi from its air terminal building clear down to one end of the runway, even though the particular airplane may not require more than one-half of the runway length for takeoff. In the arrangement shown in FIG. 2, an airplane travels the shortest possible route over the ground from its air terminal building 4A or 4B, across the apron 3A or 3B, respectively, to the taxiway 2A and then to the nearest end of the takeoff runway 1B. Also, it is usually necessary to turn from a taxiway at an angle onto the takeoff runway before the takeoff run can be started. Again, with the arrangement of taxiway 2A and runway 1B shown in FIG. 1, the airplane can taxi from an apron 3A onto the taxiway 2A at any location along its length, and after it reaches such taxiway, it may taxi to the near end of the runway 1B at considerable speed, because it is unnecessary to turn from the taxiway onto the runway. Moreover, the airplane can make its takeoff run as a continuation of its taxiing movement along the taxiway 2A without any intermediate reduction in speed.

Thus, it will be seen that an airport having an arrangement of runways and a taxiway between them, such as shown in FIG. 1, has a much larger operating capacity because first, the runways 1A and 1B can be used simultaneously for landing and takeoff and second, each runway can be cleared much more rapidly than usual by an airplane which is landing or taking off. If a greater traffic capacity is required, an additional runway 1C can be constructed parallel to the runway 1A and spaced transversely of its length a substantial distance from runway 1A, as shown in FIG. 3, and a second runway 1D can be constructed parallel to runway 1B and spaced transversely of its length from it. Still greater capacity can be afforded by constructing further runways 1E and 1F parallel to runways 1A and 1B, but at the sides opposite runways 1C and 1D, respectively, as also shown in FIG. 3. Such additional runways can be connected to the opposite ends of the intermediate taxiway 2A, as shown in that fig.

While it is preferred that the runways at opposite ends of the taxiway in a tandem arrangement of runways be in alignment, as shown in FIG. 1, the terrain or other location factors may require some departure from strictly aligned relationship of the two runways at opposite ends of the taxiway. Thus, in FIG. 4, the two runways 1G and 1H at opposite ends of the intermediate taxiway 2B are shown as being in parallel but somewhat laterally offset arrangement. In FIG. 5, the two runways 1J and 1K, the nearer ends of which are connected by the taxiway 2C, are disposed in angular relationship. In some instances, it may be desirable for the runways at opposite ends of a taxiway to be both offset laterally and disposed at some angle to each other. In all of the arrangements shown in FIGS. 1, 3, 4 and 5, however, the runways at opposite ends of the taxiway can be designated as being in tandem relationship.

For runway and taxiway arrangements such as shown in FIGS. 1, 3, 4 and 5, it is necessary that the right of way available be quite elongated, such as in excess of 2½ miles in length. Most airports now in use are constructed in an area of more or less equal length and width and without having nearly as great a length. The principle of the present invention can be adapted to some of such airports by using the arrangement shown in FIG. 6. In this instance, again, the taxiway 2D is located between the runways 1L and 1M, but in this instance, such runways are substantially parallel and simply spaced apart laterally, so that the runways and taxiway form a serpentine configuration. It will be evident from a comparison of the arrangements shown in FIGS. 1, 3, 4 and 5 with that of FIG. 6 that for runways of comparable length, the taxiway required for the arrangement of FIG. 6 is much longer than required for the other arrangements.

In this instance, aprons 3G and 3H can extend over virtually the full distance between the taxiway 2D and the respective runways, but it would not be contemplated that airplanes would cut from a runway 1L or 1M across such an apron, rather than following a connecting portion 2E or 2F, because the airport terminal facilities would be oriented to be approached from the side at which the taxiway 2D is located to promote orderliness in the movement of the airplanes, and to preserve a uniform pattern of movement, whichever runway was used for landing. It will also be evident that the connecting portions 2E and 2F between the runways and the intermediate taxiway could be interchanged end for end so that the connecting portion 2E would connect the left end of runway 1L with the left end of the taxiway 2D and the connecting portion 2F could connect the right end of the runway 1M with the right end of the taxiway 2D. Also, it will be evident that the runways 1L and 1M need not be precisely parallel, nor need their lengths be precisely in registry transversely of their lengths.

Again, it is important that the lengths of runways 1L and 1M be oriented approximately in alignment with the prevailing wind. If the wind direction should reverse, the runway previously used for landing would then be used for airplanes taking off and vice versa, as in the operation of an airport having the runway and taxiway arrangement shown in FIG. 1. In this instance, as in the other arrangements, the airplanes would always land in a direction toward the taxiway and would always takeoff in a direction away from the taxiway. In all of such installations it is preferred, therefore, that the runways be essentially level so that each runway can be used most advantageously either for landing airplanes or for airplanes taking off in either direction. While it is preferable that the intermediate taxiways also be substantially level, it would be feasible for such taxiways to slope in one direction or the other to some extent.

In FIG. 2 the airport terminal building 4A at one side of the taxiway 2A is used principally for passenger and baggage handling. At the opposite side of the taxiway, facilities 4B can be provided for handling air freight and mail and for storing and maintaining aircraft. As shown in FIGS. 1, 3 and 6, the various air terminal buildings or docks 4A for different airplanes can be arranged in a row generally parallel to the intermediate taxiway, whether that taxiway is straight as shown in these FIGS. or is somewhat curved as shown in FIGS. 4 and 5, to form cooperatively elongated generally linear air terminal means. Communication between such air terminal buildings can be expedited by shuttle buses running frequently along a road 5 adjacent to the row of terminal buildings and having turnarounds 6 at opposite ends, or a moving sidewalk 7 can extend through such air terminal buildings to connect them, or both types of connections can be used.

FIGS. 1, 3, 4, 5 and 6 illustrate representative relationships between runways and an intermediate taxiway in an airport which could be utilized wherever sufficient area of appropriate proportions is available. The second major consideration of the present invention is to provide an area of appropriate size and proportions as close to the metropolitan area being served as possible. Different expedients may be utilized in different localities to accomplish this purpose. FIGS. 2 and 7 simply show such an arrangement on land. In some instances, however, it may not be possible to find a practical location of the desired size and arrangement on land near a metropolitan area. On the contrary, such a metropolitan area may be located close to a body of water, and FIGS. 8 and 9 show a construction in which the entire airport is located over water. In FIG. 8, the taxiway 2A, the apron 3J and the terminal buildings 4A are located over a shallow body of water 8 on a platform 9 supported by piles or columns 10, extending downward through the water to the ground. Where the body of water 8 is deeper, as shown in FIG. 9, the taxiway 2A, apron 3K and air terminal buildings 4A can be mounted on a floating concrete deck 11 which is moored in a desired location by mooring lines 12, secured in place by bottom anchors 13.

A particularly economical type of construction when all factors are considered is the construction of an airport arrangement such as shown in FIGS. 1, 3, 4 and 5 near a metropolitan center on property providing multiple land use. In FIG. 10, as in the construction of FIG. 8, the taxiway 2A, apron 3J and air terminal buildings 4A are constructed on a deck 9 supported on columns 10. In this instance, however, the installation is over land, and, as shown in FIG. 10, the columns are arranged to provide bays between them suitable for ground transportation facilities and for other purposes. Thus, the bays 14 are shown as accommodating railway lines which may be used for rapid transit trains serving the airport. Bays 15 may be used for express highways or freeways, which again, may serve the airport. The bays 16 can be divided into storage and cargo handling areas beneath the air terminal buildings.

Multiple use of the airport area can, of course, involve a combination of the types of structure shown in FIGS. 7, 8, 9 and 10. Thus, for example, the airport could be built partially over water and partially over land in which the entire airport is constructed on a deck 9, as shown in FIGS. 8 and 10, but part of such deck can be over water and the other part over land. The portion over land could also contain rights of way for ground transportation. It is not unusual for railway tracks or highways to skirt bodies of water near metropolitan centers. If a portion of the water were too deep to support a deck 9 practically entirely on columns, a portion of such deck could be made to float on the body of water, as indicated in FIG. 9, if the water level could be controlled. Also, of course, part of an airport construction could be on an elevated deck 9 and another portion could be on ground.

The third major goal is to provide an airport having airplane parking facilities and airport terminal buildings which will greatly expedite parking, unloading and loading of airplanes. Such construction is shown principally in FIGS. 11 to 14. Airplanes are parked conventionally by the airplane being taxied into position adjacent to an air terminal building. When the airplane has been loaded, it either taxis away from the air terminal building, or on some occasions, must be towed away from the air terminal building by a tractor before it can taxi on its own power.

Ground maneuvering of a large airplane has required considerable space. Also, in order to avoid conflict between airplanes, modern practice has been to provide fingers extending out from the main air terminal building alongside which airplanes can be positioned, which entails long walks for passengers. In addition, some airports provide mobile extendable passageways which can be projected out from an air terminal building or finger to an airplane. Because of the increasing size of airplanes, the physical operation simply of loading passengers into and unloading them from an airplane becomes more complex.

The larger the airplane, the more passengers it is necessary to load and unload, perhaps as many as several hundred. To expedite such loading and unloading, it may be desirable to use several doorways spaced along the airplane fuselage. At the same time, the amount of baggage for such a large number of passengers is increased correspondingly. More room must be provided for such number of passengers in the airport terminal buildings. More room must be provided for parking such large airplanes. Thus, the entire problem of saving time in the use of such airplanes is greatly aggravated. The benefit in reducing the elapsed time of a supersonic airplane in flying between major population centers can be greatly reduced, if not offset almost completely, by the time required for parking, loading and unloading such an airplane at a congested airport, handling movement of passengers and baggage between airplane and ground transportation facilities, and transporting the passengers between a remotely located airport and the population center.

In the airport of the present invention, great savings of time can be accomplished by locating the air terminal buildings or docks 4A in a row and making each of such buildings of a size to serve only one airplane at a time. A single airline may utilize two or more of such buildings. It is not necessary for any particular airline to have a large number of such buildings, however, because they are constructed to unload and load passengers and baggage in large airplanes and to service such airplanes quickly and efficiently, so that a particular airplane is stationed at a given airport terminal building for a minimum length of time. Also, provision is made for moving an airplane into a position parked at such a building or dock quickly and moving it away from such building or dock quickly.

It is not intended that an airplane be parked at such an air terminal building or dock for an appreciable length of time, but instead, parking facilities can be provided on the apron 3B in FIG. 1, for example, if the airplane is to be out of service for any appreciable length of time. Passenger movement between airport terminal buildings is expedited by shuttle bus service along the straight surface roadways 5, shown in FIGS. 1 and 3, or by movable sidewalks 7 passing through the air terminal buildings so as to expedite transfer of passengers from one flight to another whether of the same airline or of different airlines.

To expedite parking of airplanes at the air terminal buildings, the apron 3A, 3C, 3E or 3G adjacent to such buildings will be large enough so that an airplane can taxi in one direction or the other along the row of airport terminal buildings 4A into a position in front of the particular building where the airplane is to be loaded and/or unloaded. From such position, the airplane will be moved transversely of its length toward the airport terminal building until the wing of the airplane has actually been moved into the building and the airplane fuselage has been moved into a position close alongside the building. When the loading and/or unloading operation of passengers and baggage has been completed, the airplane will be moved transversely of its length to a location far enough from the airport terminal building so that the airplane can maneuver easily and quickly in taxiing to a taxiway 2A, 2B, 2C or 2D.

Various types of expedients can be used for shifting an airplane transversely of its length into and out of parked position alongside an air terminal building. The landing gear of the airplane itself may be designed to support the airplane for movement transversely of its length, in which event pulling means such as endless cables or chains could be provided to roll the airplane along the apron directly toward and away from an airport terminal building. It is preferred, however, to provide transfer means for the airplane in the form of movable platform means onto which the airplane is taxied. Thus, in FIG. 11, sectional transfer platform means are illustrated as being composed of a plurality of platform sections 17A, 17B, 17C, 17D and 17E, which are movably supported, respectively, on depressed tracks 18A, 18B, 18C, 18D and 18E.

The platform sections which will support a particular airplane for transfer to a position alongside the air terminal building will depend upon the type and size of airplane, the location of the landing gear on such airplane, and the direction in which the airplane is headed. In FIG. 11, the landing gear is shown as being positioned on platform sections 17C and 17E so that it is necessary to move only such sections in order to transfer the airplane. If the airplane were headed in the opposite direction, it would be supported on sections 17A and 17C. In some instances, it might be necessary to shift two adjacent platform sections as well as another platform sections. Also, the size and number of the shiftable platform sections could differ according to the type of airplanes to be accommodated on the particular transfer means.

Figure 13:
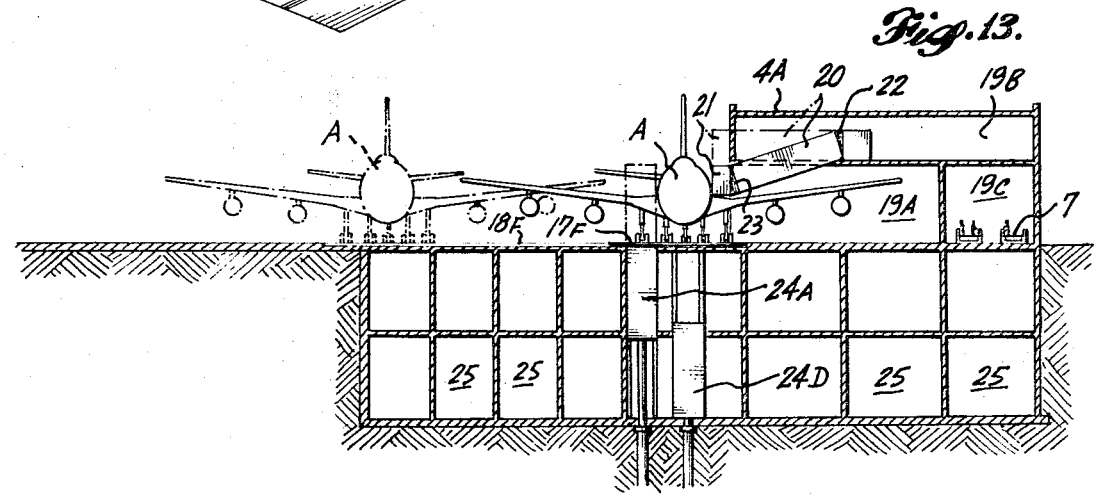
FIG. 13 is a transverse vertical section through an airport terminal structure of the type shown in FIG. 11.
Figure 14:
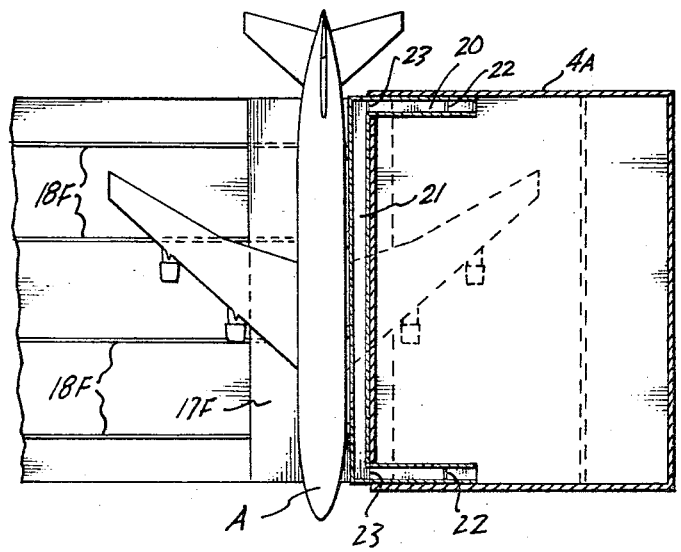
FIG. 14 is a plan of a portion of an airport structure like that shown in FIG. 12 and similar to that shown in FIG. 13.

The airplane would be positioned on such transfer means so that the empennage would project beyond one end of the airport terminal building, as shown in FIG. 11. A space 19A is provided in each airport terminal building to receive one wing of the airplane by spanwise movement of it, as shown in FIGS. 11, 13 and 14. Above this building compartment is a passenger accommodation compartment 19B, shown in FIG. 13. Below this passenger accommodation compartment is a further compartment 19C which could provide for a movable sidewalk 7 and perhaps for offices and other facilities. The size and shape of each terminal building can, of course, be designed to meet the requirements of a particular airline or airport.

Passengers can be loaded into or unloaded from several doors spaced along the length of the fuselage of an airplane A by two or more ramps 20 supporting an aisleway 21, which can be lowered from the broken line position shown in FIG. 13 to the solid line position of that FIG. alongside the airplane fuselage. Hinge sections 22 and 23 adjacent to opposite ends of the ramps 20 enable such ramps to tilt into inclined positions as may be necessary to accommodate the elevational movement of the aisleway. Passengers may also be loaded into at least one doorway at the side of the airplane fuselage remote from the air terminal building by an elevator 24A raisable from a position below the ground level.

Additional elevators 24B, 24C and 24D can be arranged immediately below the airplane, as shown in FIGS. 11 and 13, for the purpose of lifting baggage and cargo from a location below ground level into a position adjacent to the bottom of the airplane fuselage or even into the airplane fuselage, depending upon the design of the airplane. Various compartments 25 below ground level and below the air terminal building as shown in FIG. 13 can be utilized for storage, offices and other facilities.

Also, another elevator 24E can be provided to service the rear portion of an airplane fuselage if it is headed in the direction opposite that shown in FIG. 11.

When the loading of an airplane has been completed, the elevators will be lowered to a position below the ground level, the ramps 20 will be swung to raise the aisleway 21 into the broken line position shown in FIG. 13, and the transfer platform sections will be shifted from positions alongside the airport terminal building into their outer positions at the left of FIG. 11. By this manipulation, the airplane will be transferred into a position where its wing has been withdrawn from the compartment 19A of the air terminal building so that the airplane is free to taxi out to the taxiway. While the airplane is in the position alongside the air terminal building, the engines below the wing in the compartment 19A can be serviced, and fuel can be supplied to that airplane wing without the workmen being exposed to the weather. Moreover, such compartment prevents access of the public to the airplane wing.

Instead of the airplane transfer platform being divided into sections, as shown in FIG. 11, such platform can be unitary as shown in FIGS. 12 and 14. In such event, the entire platform 17F will be supported on suitable rails 18F spaced along the length of the platform. Endless chains or cables connected to the transfer platform means can be operated to shift such means toward and away from the air terminal building in the manner described. The outer location of the transfer platforms and the distance between adjacent transfer platforms for adjacent air terminal buildings must, of course, be sufficiently great to enable an airplane to taxi easily onto and off of such platform means without substantial risk of colliding with an airplane parked at an adjacent air terminal building or running into the depression left by movement of adjacent transfer means into a position alongside its terminal building.

I claim:

1. An airport comprising two spaced runways, one available for landing and the other available for takeoff in generally the same direction, a taxiway joining one end of one of said runways and one end of the other of said runways and including an elongated generally linear portion, elongated generally linear air terminal means accessible to airplanes from the elongated generally linear portion of said taxiway and including a substantial number of stations to accommodate individual airplanes, respectively, for loading and unloading, arranged in a row extending generally parallel to the length of the elongated generally linear portion of said taxiway, but said row of stations being offset to one side of said taxiway and out of alignement with said runways, and apron means extending contiguously and substantially continuously along said taxiway for a distance at least substantially equal to the length of said air terminal means, at the same side of said taxiway as said air terminal means and affording access thereto, and said taxiway and said apron means and the junction therebetween being substantially unobstructed along substantially the entire length of said air terminal means for free movement of airplanes between said taxiway and said air terminal means.

2. An airport comprising two spaced runways, one available for landing and the other available for takeoff in generally the same direction, a taxiway joining one end of one of said runways and one end of the other of said runways and including an elongated generally linear portion, elongated generally linear air terminal means accessible to airplanes from the elongated generally linear portion of said taxiway and including a substantial number of stations to accommodate individual airplanes, respectively, for loading and unloading, arranged in a row extending generally parallel to the length of the elongated generally linear portion of said taxiway, but said row of stations being offset to one side of said taxiway and out of alignement with said runways, and airplane passageway means connecting said linear air terminal means and said elongated generally linear portion of said taxiway, said airplane passageway means being of an extent from said air terminal means to said taxiway elongated generally linear portion in a direction parallel to the length of said air terminal means at least substantially equal to the length of said air terminal means, and said elongated generally linear portion of said taxiway being at least substantially as long as the length of said generally linear air terminal means.

3. The airport defined in claim 2, in which the runways are arranged in tandem, and the taxiway joins adjacent ends of the runways.

4. The airport defined in claim 2, and an additional runway located generally parallel to, and spaced laterally from, one of the spaced runways, an end of such additional runway being connected to an adjacent end of the taxiway.

5. The airport defined in claim 2, in which the taxiway is supported over a body of water.

6. The airport defined in claim 2, in which the taxiway is floatably supported by a body of water.

7. The airport defined in claim 2, in which the taxiway is supported on columns.

8. The airport defined in claim 2, in which a ground transportation right of way extends beneath the airport generally parallel to the runways and taxiway generally linear portion.

9. The airport defined in claim 2, in which the air terminal means include a plurality of air terminal buildings arranged in a row.

10. The airport defined in claim 2, in which the air terminal means include an air terminal building having a covered recess beneath its roof with a side opening at the side toward the taxiway into which the wing of an airplane can be moved spanwise.

11. The airport defined in claim 10, in which the air terminal building includes a passenger station overlying and extending beyond opposite sides of the wing-receiving recess, and elevationally adjustable means for transferring passengers from the passenger station to an airplane having its wing received in such recess.

12. The airport defined in claim 11, in which the means for transferring passengers includes an elongated aisleway having its length extending generally parallel to a side of the terminal building having the wing-receiving recess and means supporting said aisleway for elevational movement.

13. The airport defined in claim 10, and elevator means raisable alongside the air terminal building from a location below the airplane for loading an airplane therefrom.

14. The airport defined in claim 13, in which the elevator means is located directly beneath an airplane station located alongside the air terminal building.

15. The airport defined in claim 2, in which the spaced runways are in generally parallel arrangement, offset transversely of their lengths but with their lengths at least partially overlapping, and the taxiway connects an end of one runway to the opposite end of the other runway with the generally linear portion of the taxiway extending generally parallel to and located between the runways and generally in registry with the runways transversely of their lengths so that the runways and the taxiway form a serpentine configuration, the air terminal means being located between a runway and the generally linear portion of the taxiway.

16. The method of channeling airplane traffic at an airport which comprises landing airplanes in one direction on a landing runway, taxiing the airplanes generally in the same direction from the landing runway onto a taxiway, moving the airplanes forward from the taxiway along different approach routes substantially directly toward loading and unloading stations selected, respectively, from a substantial number of loading and unloading stations offset laterally from the taxiway and arranged in a row substantially parallel to the taxiway, parking the airplanes at such selected loading and unloading stations, respectively, headed generally in the same direction along such row, loading and/or unloading the airplanes at such loading and unloading stations, moving each airplane away from its respective loading and unloading station without rearward movement to the same taxiway along a route offset lengthwise of the taxiway from the approach route of such airplane to its station, taxiing the airplanes from the taxiway to a takeoff runway different from but generally parallel to the landing runway, and taking off the airplanes in the same general direction in which the airplanes landed.

17. The method defined in claim 16, including the step of moving an airplane transversely of its length toward a loading and unloading station prior to the loading and/or unloading operation, and, following the loading and/or unloading operation, moving the airplane transversely of its length away from such loading and unloading station.

18. The method of channeling airplane traffic at an airport which comprises landing airplanes successively in one direction on a landing runway, taxiing the airplanes forwardly from the landing runway onto an elongated taxiway, taxiing the airplanes forwardly from the taxiway along different courses toward different terminal docks, respectively, elevated above the taxiway and arranged in a row forming an elongated terminal having its length extending generally parallel to the length of the taxiway, docking the airplanes close alongside their respective elevated terminal docks, loading and/or unloading the airplanes at the terminal docks generally horizontally at elevations above the ground, moving the airplanes from the terminal docks back to the taxiway without rearward movement of the airplanes, and taking off the airplanes in the same general direction in which they landed.

19. The method defined in claim 18, including the step of moving each airplane from a location spaced from its terminal dock sidewise toward its terminal dock and thereby locating the airplane fuselage close alongside such terminal dock, and, following the loading and/or unloading operation, moving each airplane sidewise away from its terminal dock.

PO-1050
(5/69)

UNITED STATES PATENT OFFICE
CERTIFICATE OF CORRECTION

Patent No. 3,554,470                    Dated   January 12, 1971

Inventor(s)  Robert E. Dudley

It is certified that error appears in the above-identified patent and that said Letters Patent are hereby corrected as shown below:

Column 7, line 62, change "alignement" to --alignment--.

Column 8, line 8, change "alignement" to --alignment--.

Column 9, line 2, change "loading and unloading" to --loading-and-unloading--; line 4, change "ing and unloading" to --ing-and-unloading--; line 6, change "loading and unloading" to --loading-and-unloading--; line 9, change "loading and unloading" to --loading-and-unloading--; line 10, change "loading and unloading" to --loading-and-unloading--; line 18, after "loading" insert a hyphen; line 19, after "and" (first instance) insert a hyphen; line 22, change" loading and unloading" to --loading-and-unloading--.

Signed and sealed this 27th Day of April 1971.

(SEAL)
Attest:

EDWARD M. FLETCHER, JR.                    WILLIAM E. SCHUYLER,
Attesting Officer                          Commissioner of Paten